United States Patent [19]

Hayes

[11] 3,931,806
[45] Jan. 13, 1976

[54] METHOD AND APPARATUS FOR STORING A MEDIUM HEATED BY SOLAR ENERGY

[75] Inventor: Thomas Edward Hayes, Goshen, Ind.

[73] Assignee: Johnson Service Company, Milwaukee, Wis.

[22] Filed: May 6, 1974

[21] Appl. No.: 467,400

[52] U.S. Cl. .................................. 126/400; 165/18
[51] Int. Cl.² .......................................... F24J 3/02
[58] Field of Search ............. 126/271, 400; 165/18; 237/1 A

[56] References Cited
UNITED STATES PATENTS

| | | | |
|---|---|---|---|
| 2,342,211 | 2/1944 | Newton | 237/1 A |
| 2,544,474 | 3/1951 | Swanton, Jr. | 237/1 A |
| 2,575,478 | 11/1951 | Wilson | 237/1 A |
| 2,713,252 | 7/1955 | Jackson et al. | 165/18 |
| 2,943,842 | 7/1960 | Sullivan | 165/18 |
| 3,295,591 | 1/1967 | Thomason | 126/400 |

Primary Examiner—W. F. O'Dea
Assistant Examiner—Peter D. Ferguson
Attorney, Agent, or Firm—Johnson, Dienner, Emrich & Wagner

[57] ABSTRACT

A heating system has means for directing heat only to a portion of a medium for storing heat which portion is at a temperature below that to which heating means then heats the medium. The system then functions to store heat in the medium during periods of less-than-maximum heating of the medium without degrading the temperature of a higher-temperature portion of the medium. The system has particular utility with a solar heat collector from which the available heat varies with the intensity of the solar energy. Heat is then collected in the portion of the medium during periods of marginal solar energy intensity without degrading the higher temperature of another portion of the medium heated to a higher temperature during a prior period of greater solar energy intensity. In a specific embodiment the system has three compartments for separating a fluid heat-storing medium into portions, a pump supplying the fluid to a solar heat collector, and a pump supplying the fluid to a heat exchanger for heating a house. The means for directing heat to a portion of the medium then direct fluid heated in the collector to a compartment of fluid at a temperature nearest below that to which the solar heat collector then heats the fluid. The pump supplying fluid to the collector withdraws fluid from a compartment at a lowest temperature to maximize the thermal efficiency of the collector and exchanger.

18 Claims, 5 Drawing Figures

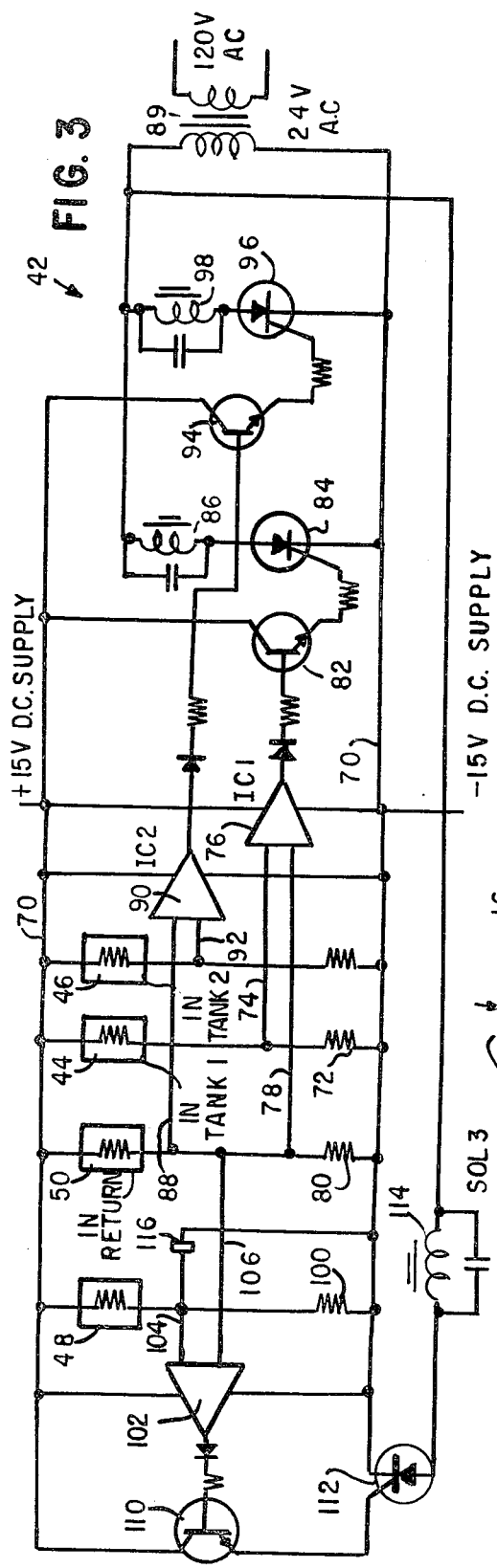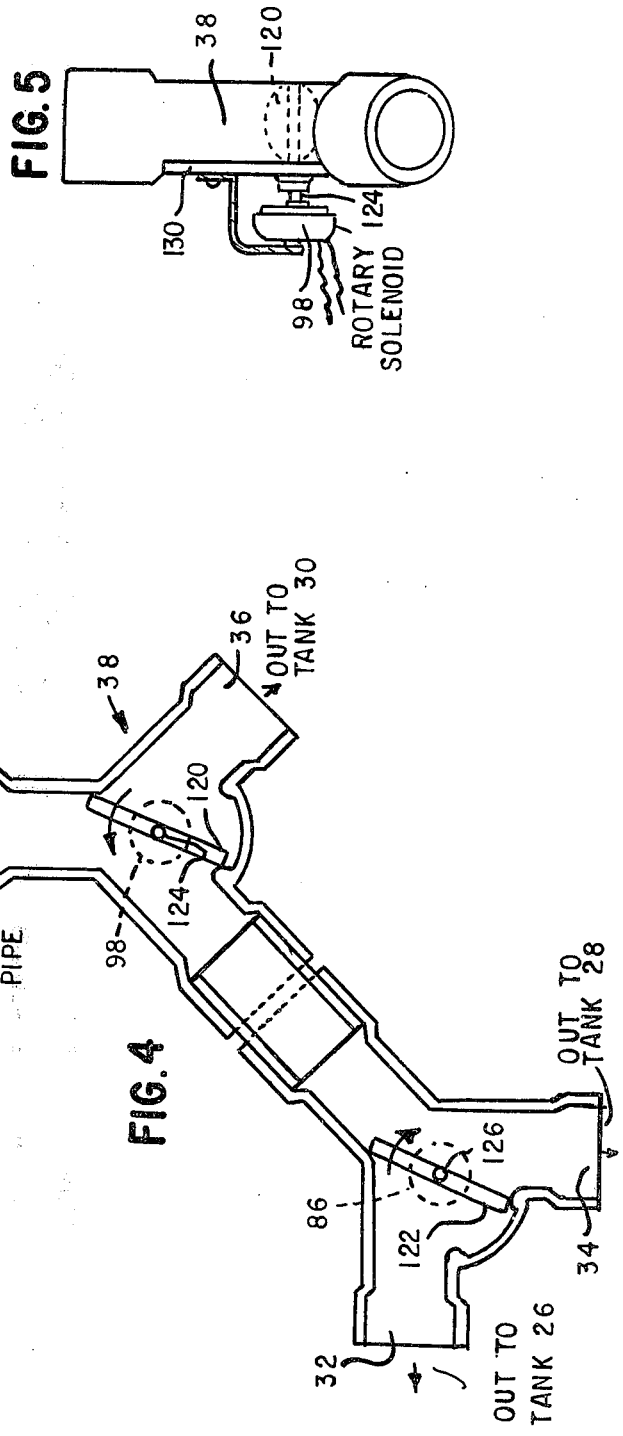

METHOD AND APPARATUS FOR STORING A MEDIUM HEATED BY SOLAR ENERGY

BACKGROUND OF THE INVENTION

This invention relates to a heating system having means for storing heat. The system has particular and preferred utility in a heating system using solar energy as a source of heat.

Several factors related to the production of heat for structural space heating systems, hot water heatins systems and other heating systems have recently coalesced to encourage new technologies for producing heat in such heating systems. Specifically, the cost of heat energy has continued to rise. In addition, the vast consumption of heating energy, particularly in urban areas, has provided substantial problems of pollution, and, most recently, a shortage of traditional hydrocarbon fuels has developed. Each of these factors has contributed to recently increased interest in sources of heat energy alternative to those traditionally employed and more efficient utilization of heat energy produced from all sources. One such alternative energy source is energy radiated from the sun.

Solar energy has, of course, long been known but has not been significantly exploited for two principal reasons. The first reason is the relatively low density of the energy per unit area of a surface collecting the energy. The low energy density requires both substantial surface areas and relatively long times for the collection of a required quantity of heat energy. The second reason is the uncontrollable availability of energy from the sun to times which may not coincide with the desired times of energy utilization. Specifically, solar energy is only available during daylight hours and even during daylight hours varies in available intensity with the angle of incidence of the energy which, of course, depends upon the time of day, and varies with the degree of cloud cover.

Both of these problems may be mitigated by means for the storage of heat energy accumulated during times of excess availability for later distribution. Such heat storage means may also have utility with heating systems employing traditional energy sources by permitting consumption of the energy during convenient times such as off-peak hours in the availability of electric energy or hours of relatively low pollution.

One system for the storage of heat energy, particularly heat energy from a solar collector, is disclosed in U.S. Pat. No. 3,369,541 issued Feb. 20, 1968 in the name of Thomason. This patent discloses two embodiments of a heat storage device each having a tank containing a heat-storing, fluid medium. A pump circulates the fluid from the tank to a solar-energy heat collector and returns the heated fluid from the collector to the tank for storage. Heat exchange passages adjacent the tank receive a flow of air which is heated in the passages and discharged into a structure as space heat. In only one embodiment a collection of stones or other heat storage and heat exchanger material surrounds the tank in thermal communication with the tank for the storage of heat brought to the tank by the fluid and in heat exchanging relation with the air to be heated by pumping the air through interstices between the stones or other material.

In both embodiments disclosed in the patent the tank for storing the heated fluid medium is internally entirely open to permit uninhibited mixing of portions of the fluid heated to different temperatures, for example, fluid heated at times of different solar energy intensity. Moreover, inlet and outlet passageways for conveying the fluid to and from the solar heat collector are disposed in diagonally opposite corners of the tank; this arrangement would appear to promote a generally rotary, mixing circulation of the fluid in the tank as caused by the jet action of the fluid withdrawn from the tank for heating in the collector and returned to the tank for storage. Mixing differently heated portions of the fluid will degrade the higher temperature of fluid portion heated to the temperature toward the lower temperature of other fluid portions of the tank.

In the patent, water is suggested as the fluid. In the embodiment having stones for the storage of heat, it is believed that the stones, although 2½ times heavier than water, have a specific heat of only ¼, to provide a thermal heat storage efficiency only 60% of that of a system utilizing only water for the storage of heat.

Systems for heating hot water with solar energy have been commercially available for a number of years. However, it is believed that these systems have only a heat collector and a tank for the storage of water heated in the collector. A discharge pipe then distributes the heated water to hot water outlets as well known in plumbing systems distributing hot water from water heaters using more conventional energy sources. As with conventional water heaters, it is believed that the tanks storing solar heated water rely on convection currents of the water, with or without an internal pipe structure for directing the convection flow of the water, to maintain a uniform temperature of heated water in the tank. The uniform temperature of the water in such water heaters is considered desirable to provide the maximum quantity of water heated to a desired temperature, usually a temperature preset with a thermostat connected to the water heater.

The relatively low energy density and variable availability of solar energy additionally present another problem. Specifically, a medium heated by a solar heat collector is often heated to a temperature only slightly above that at which it was introduced into the solar heat collector. It is then quite possible that for a large part of a day the solar heat collector could heat the medium to a temperature warmer that that at which it was supplied to the collector but cooler than the warmest temperature to which a portion of the medium was earlier heated. Operation of a system under such conditions will degrade the maximum temperature of the heat storing medium even though additional heat was supplied to the entire system during the heat collecting operation.

This problem is not ordinarily encountered in heating systems utilizing traditional sources of heat energy because these sources of heat energy are selected to provide heating temperatures which are substantially in excess of those required in the system. Moreover, the traditional sources of heat energy usually provide substantially constant heating temperatures. For example natural gas flames at a substantially constant temperature of about 3800° F., a constant temperature substantially in excess of that required from systems for heating structures or hot water.

It is also well-known that the thermal efficiency of heat exchange devices both for the collection and utilization of heat is greatest with the greatest disparity of temperatures between the media between which heat is to be exchanged. It is therefore desirable in a system having means for heating a medium to introduce the medium into the heating means at the lowest possible temperature. Similarly, it is desirable to introduce a medium into means for utilizing the heat of the medium at the highest possible temperature.

SUMMARY OF THE INVENTION

Accordingly, it is an object of the invention to provide a heating system having a medium for storing heat and means for heating the medium without degrading a higher temperature of a previously heated portion of the medium.

It is a further object of the invention to provide a heating system having a medium for storing heat and means for withdrawing heat from a highest temperature portion of the medium to provide the greatest thermal efficiency to the heat withdrawing means.

It is still a further object of the invention to provide a heating system having means for heating a lowest temperature portion of the medium to provide the greatest thermal efficiency to the heating means.

It is still further object of the invention to provide each of the foregoing objects in a system using solar energy as means for heating the medium.

To these ends the invention provides in a heating system having a medium for storing heat, means for heating the medium and means for withdrawing heat from the medium for use, a method and apparatus for storing heat in the medium between a time at which the medium is heated and a time at which the heat is withdrawn for use.

The method comprises at least partially dividing the medium for separating portions of the medium potentially at different temperatures and directing heat from the heating means only to a portion of the medium at a temperature below the temperature to which the heating means then heats the medium. By directing the heat only to a portion of the medium at a temperature below that to which the medium is then being heated, the method functions to store heat in the medium during periods in which the heating means heats the medium only to a temperature below that to which another portion of the medium was previously heated without degrading the higher temperature of the other portion of the medium.

In a particular embodiment, the means for heating the medium is a solar heat collector, the available heat from which varies with the variable intensity of the solar energy. The method then functions to permit the system to store heat in the medium during periods of marginal or less-than-maximum solar heat energy intensity without degrading the maximum temperature of a portion of the medium previously heated to a higher temperature during a prior period of greater solar heat-energy intensity.

In another embodiment the method additionally comprises withdrawing the heat only from a highest temperature portion of the medium to permit the greatest thermal efficiency of the means withdrawing the heat for use. In still another embodiment, the medium is a fluid which is supplied to the means for heating the medium. In this embodiment the method additionally comprises supplying a lowest temperature portion of the medium to the heating means to permit the greatest thermal efficiency of the means heating the medium.

The apparatus comprises means at least partially dividing the medium for providing portions of the medium at potentially different temperatures and means directing heat from the heating means only to a portion of the medium at a temperature below the temperature to which the heating means then heats the medium for storing heat in the medium when the heating means heats the medium only to a temperature below that to which another portion of the medium was previously heated without degrading the maximum temperature of the previously higher-temperature-heated portion of the medium. In the particular preferred embodiment wherein the means for heating the medium is a solar heat collector, the apparatus aso provides means for storing heat in the medium during periods of marginal or less-thann-maximum solar heating of the medium without degrading the temperature of the highest temperature portion of the medium.

Another embodiment has means withdrawing heat from a highest temperature portion of the medium for permitting the greatest thermal efficiency of the means withdrawing the heat. In still another embodiment, the medium is a fluid supplied to the heating means and the embodiment additionally comprises means supplying the medium to the heating means from a lowest temperature portion of the medium for permitting the greatest thermal efficiency of the heating means.

In this description of the invention the term "heat" is used in the sense of adding energy such as to tend to increase the temperature of the medium to which the heat is supplied. However, it is specifically intended that the invention shall also include within its scope heating in the sense that energy is withdrawn so as to tend to reduce the temperature of a medium, that is, to cool the medium. When the system of the invention is so used as a cooling system, it will be additionally understood that the terms above and below the temperature of another portion of the medium are reversed from their ordinary meaning to indicate temperatures below and above, respectively, the temperatures of the other portions of the medium.

DESCRIPTION OF THE DRAWINGS

A preferred embodiment which is intended to illustrate and not limit the invention will now be described with reference to drawings, in which:

FIG. 3 is a more detailed illustration of a portion of the embodiments shown in FIGS. 1 and 2;

FIG. 4 is a more detailed sectional illustration of another portion of the embodiments shown in FIGS. 1 and 2; and FIG. 5 is a view of a portion of that portion of the embodiments shown in FIG. 4.

DESCRIPTION OF THE PREFERRED EMBODIMENT

Figure 1:
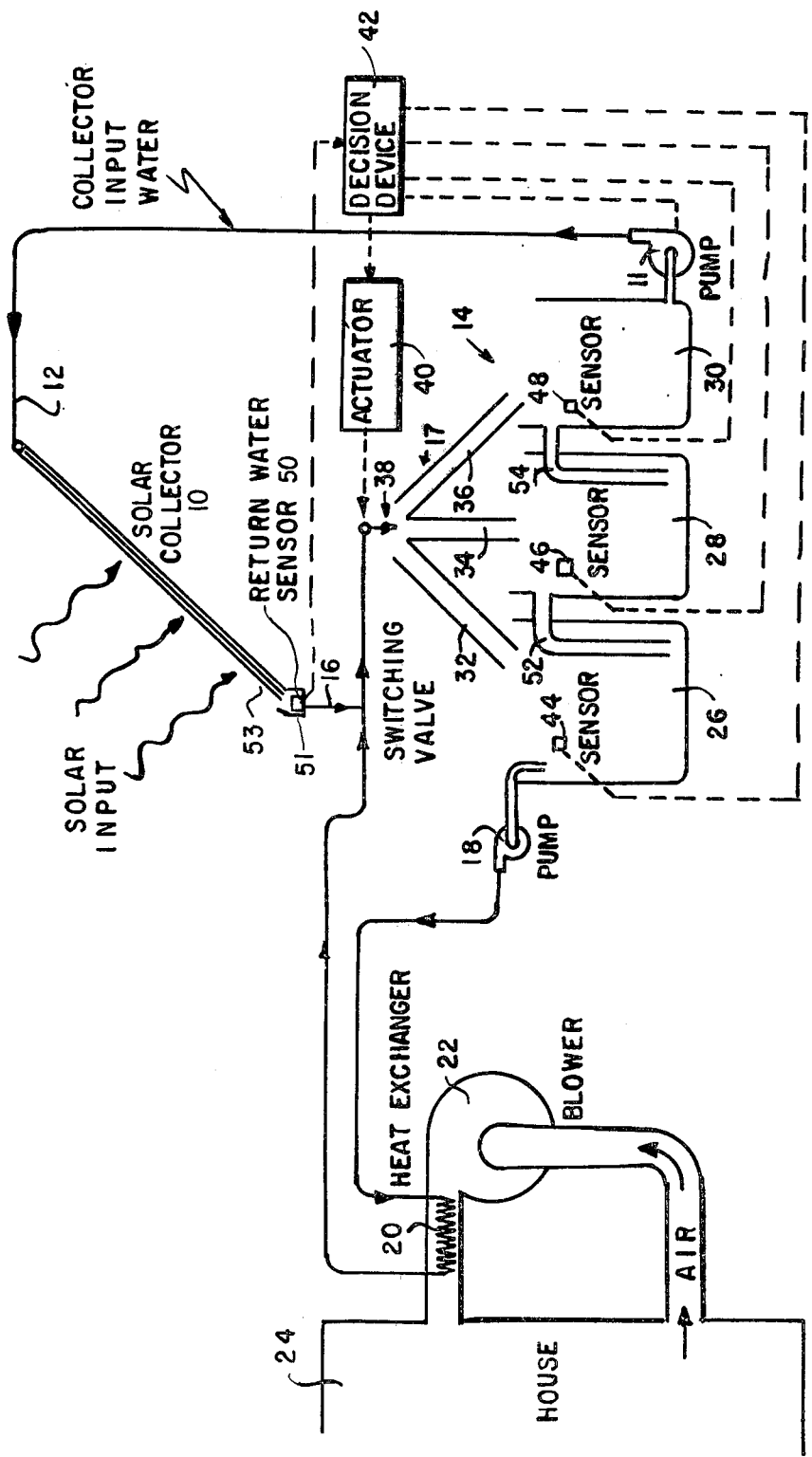
FIG. 1 is a schematic illustration of one preferred embodiment.

FIG. 1 shows as a preferred embodiment a system for space heating a structure with heat from solar energy. The system has a solar heat collector 10 for heating a fluid medium supplied to the collector through a pipe 12 from a fluid storage means at 14. The solar heat collector 10 may, for example, be of the type disclosed in U.S. Pat. No. 3,387,602 issued June 11, 1968, in the name of Thomason. A pipe 16 carries heated fluid from the heat collector 10 to means 17 directing the heated fluid to the storage means 14. The fluid storage means 14 then stores the heated fluid for later use.

To use the heat stored in the fluid, a pump 18 withdraws heated fluid from the storage means and supplies the heated fluid to a heat exchanger 20 for heating air passed through the heat exchanger by a blower 22. Air heated in the exchanger is then advanced into a structure, house 24, for space heating the house. Fluid from the heat exchanger is mixed with that returned to the fluid storage means from the solar heat collector by the pipe 16.

The fluid storage means 14 is a tank partially divided into three compartments or separate tanks 26, 28 and 30. In the embodiment shown in FIG. 1 the pump 11 withdraws fluid for heating in the collector 10 from the compartment 30 while the pump 18 withdraws fluid for heating the house 24 from the compartment 26.

The means directing the fluid from the pipe 16 to the storage compartments 26, 28 and 30 comprises pipes 32, 34 and 36, each positioned to carry the fluid to the respective compartments as controlled by a distribution valve 38 selectively connecting each pipe 32, 34, 36 to the fluid return pipe 16. An actuator 40 moves the valve 38 to direct fluid to one of the pipes 32, 34, 36 as directed by a decision device 42.

The decision device is connected to sensors 44, 46, 48 for sensing the temperature of the fluid in each of the compartments 26, 28 and 30, respectively, and to sensor 50 for sensing the temperature of the fluid in the pipe 16 and other, later described functions. The decision device 42 compares the sensed temperature of the fluid in each compartment with the temperature of the heated fluid being returned from the heat collector 10 in the pipe 16 to signal the actuator to move the valve to direct the fluid through one of the pipes 32, 34, 36 to a compartment holding fluid at a temperature lower than that of the fluid then passing through pipe 16 from the heat collector 10.

The operating scheme for the system is to direct heated fluid to a comparment containing fluid at a nearest temperature lower than the collector 10 heated fluid, to supply the heat collector 10 with fluid from a compartment containing the lowest temperature fluid and to supply the heat exchanger 20 with fluid from a compartment containing the highest temperature fluid. Therefore, the decision device 42 is designed to cause the actuator to direct the fluid through the pipe 32 supplying the compartment 26 if the temperature of the fluid in the pipe 16 exceeds the temperature of the fluid in each of the compartments, to direct the fluid through pipe 34 to compartment 28 if the temperature of the fluid in the pipe 16 exceeds that of the fluid in only compartments 28 and 30 and to direct the fluid through pipe 36 to compartment 30 if the temperature of the fluid in pipe 16 exceeds that of the fluid in only compartment 30. The compartments thus order the fluid into strata of different fluid temperatures with the compartment 26 at a higher or equal temperature to the temperature of the fluid in each of the other compartments and the temperature of the fluid in the compartment 30 at a lower or equal temperature to the fluid in each of the other compartments. The decision device 42 additionally has means connected to the pump 11 for cutting off the flow of fluid to the heat collector if the temperature of the fluid from the heat collector in the pipe 16 is lower than that of the temperature in the lowest temperature fluid compartment 30.

The tanks are additionally interconnected by overflow devices 52 and 54. When fluid is supplied to one of the compartments 26 or 28 other than the lowest temperature compartment 30 from which the pump 11 always withdraws the fluid, excess fluid supplied to the compartments 26 or 28 will overflow toward the compartment 30. On the other hand, when fluid is supplied to one of the compartments 28, 30 other than the highest temperature compartment 26 from which the pump 18 withdraws fluid, excess fluid supplied to the compartments 28 or 30 will overflow toward the compartment 26. The overflow device 52 comprises a pipe extending from an upper portion of the tank 28 to a lower portion of the tank 26, all of the tanks accomodating fluid to a like level. Overflow device 54 comprises a pipe similarly extending between compartments 28 and 30.

Figure 2:
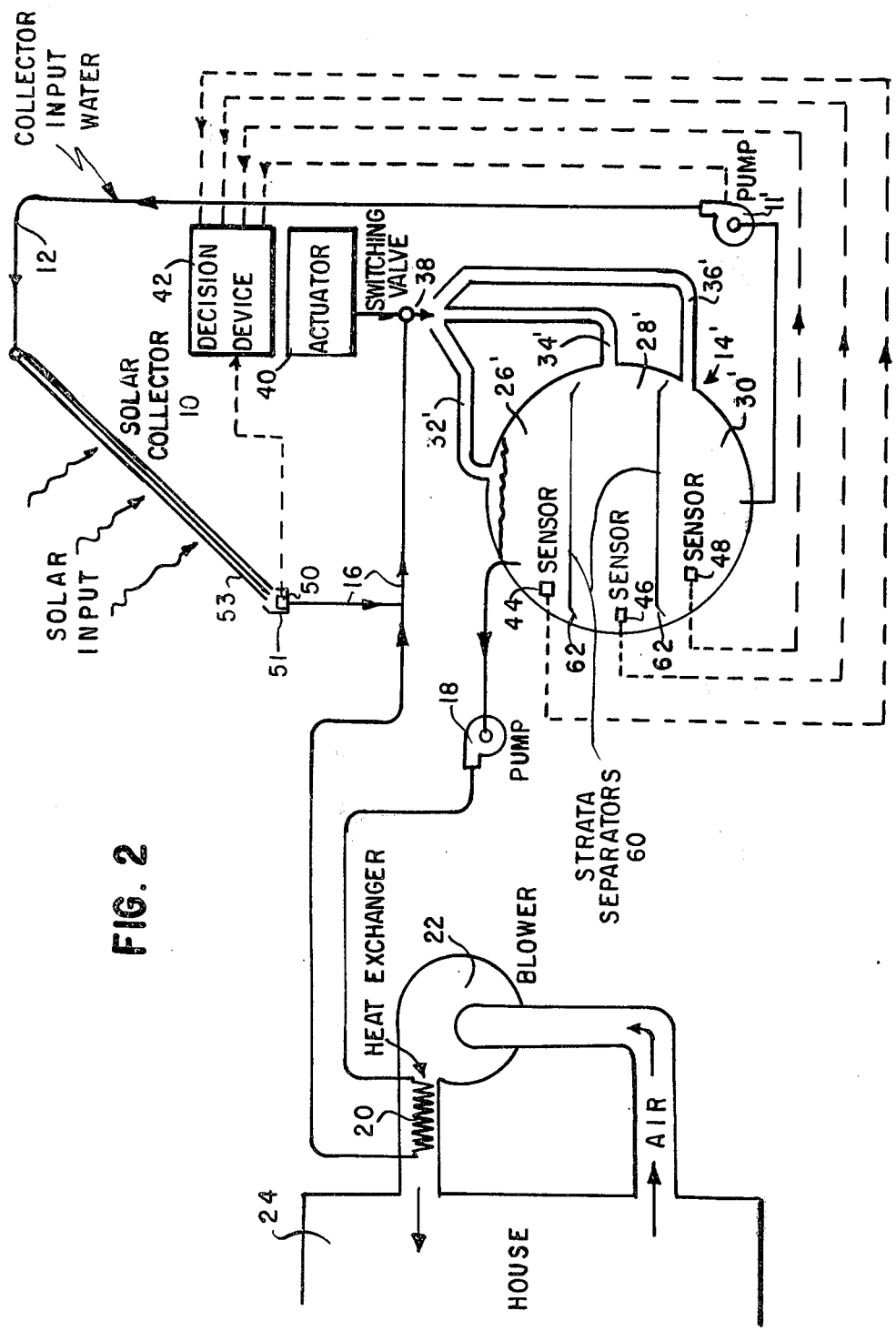
FIG. 2 is a schematic illustration of another but also preferred embodiment.

FIG. 2 shows another preferred embodiment similar to that shown in FIG. 1 except in the fluid storage means 14'. As illustrated in FIG. 2, the fluid storage means 14' comprise a single tank substantially divided into compartments 26', 28' and 30' by separators 60 forming vertically disposed strata or portions of the fluid in the tanks. The strata separators 60 each have openings 62 interconnecting strata of the tank to form overflow passages from one stratum to the next. The openings 60 thus function similarly to the overflow devices 52 and 54 shown in FIG. 1. Each strata of the tank receives fluid from a pipe 32', 34' and 36' as directed by a switching valve 38 moved by an actuator 40 under the direction of a decision element 42 which is responsive to temperature sensors 44–50 in similar arrangement with that described with reference to FIG. 1.

The decision element 42 is again biased to cause the valve 38 to direct fluid hotter than that in any strata to the stratum or compartment 26', to direct fluid hotter than that in only strata 28' or 30' to stratum 28', and fluid hotter than only that in stratum 30' to stratum 30'. The stratum 26' will thus be at a temperature equal to or higher than that of any of the other strata while the strata 30' will be at a temperature equal to or lower than that of the temperature of the fluid in any of the other strata. As before, the pump 18 withdraws heated fluid from stratum 26' to a heat exchanger 20 for heating the house 24 while the pump 11 withdrawn fluid from stratum 30' for heating in the heat collector 10.

FIG. 3 is a schematic of the decision device 42 and temperature sensors 44–50. Each of the temperature sensors 44–50 is a thermistor connected across DC power supply busses 70 and in potential-dividing series connection with a resistor.

The thermistor temperature sensor 44 in fluid compartment 26 (FIG. 1) is connected at one end to one DC power supply bus 70 and at the other to potential dividing resistor 72 and to an input lead 74 to an operational amplifier 76. Another input lead to the operational amplifier 76 is similarly connected between an NTC thermistor forming the temperature sensor 50 and a potential dividing resistor 80, the thermistor-resistor also being connected across the DC power supply. The operational amplifier 76 is connected as a potential comparitor for comparing the potentials on the leads 74 and 78 connected to the operational amplifier. In such well-known connections of operational amplifiers, the amplifier provides an output potential saturated to a positive or negative value depending upon the relative polarity of the potentials applied to the input leads 74 and 78 to the operational amplifier.

Then, if the fluid in the return pipe 16 is warmer than the fluid in the compartment 26, the thermistor temperature sensor 50 sensing the temperature of the fluid in the return pipe will have a lower resistance than the thermistor temperature sensor 44 sensing the temperature of the fluid in the compartment 26. This condition applies a higher potential to the lead 74 than to the lead 78. The lead 74 is a non-inverting input to the potential comparitor operational amplifier 76 to trigger a non-inverted saturated positive potential from the operational amplifier 76. This positive potential is applied to the base of a transistor 82 to trigger conduction of the transistor 82. The potential from conducting transistor 82 is applied to the gate of an SCR 84 to then trigger conduction of the SCR 84. The SCR 84 is connected in series with a coil of a solenoid 86 forming part of the actuator 40 (FIG. 1) and across a power supply transformer 89. Conduction through SCR 84 then energizes the solenoid 86 to move the valve 38 to direct fluid from the pipe 16 to the compartment 26.

If the temperature of the return fluid as sensed by the thermistor sensor 50 is cooler than the temperature of the fluid in the compartment 28 (FIG. 1) as sensed by the thermistor sensor 46, the thermistor sensor 46 will be of lower resistance than the thermistor sensor 50. A non-output-inverting input lead 88 of an operational amplifier 90, connected as a potential comparitor in similarity with the operational amplifier 76, is connected to the thermistor 50 while an output-inverting lead 92 is connected to the thermistor 46. Under the conditions in which the returning fluid in the pipe 16 (FIG. 1) is cooler than the fluid in the compartment 28, the lead 88 will be positive with respect to the lead 92 and the operational amplifier 90 will provide a positive output to the base of a transistor 94 to trigger conduction of the transistor. Conduction of transistor 94 triggers conduction of an SCR 96 which, like SCR 84, is connected in series with an actuating coil of a solenoid 98. The solenoid 98 then controls the valve 38 to direct the returning fluid to the compartment 30.

If the returning fluid in pipe 16 (FIG. 1) is warmer than that in compartments 28 and 30 but cooler than that in the compartment 26 the relative resistances of thermistor-sensors 44 and 50 and sensors 46 and 50 is reversed from that just described to reverse the relative polarity of the potentials on input lead pairs 74 and 78 and 88 and 92 connected to the thermistor-sensors. Both operational amplifiers 76 and 90 then provide an output potential saturated to a negative potential value. This low potential will not trigger conduction of the transistors 82 or 94 connected to the operational amplifiers. Neither SCR 84 or 96 then conducts and neither solenoid 86 or 98 is then energized. The switching valve 38 (FIG. 1) then moves to a stable condition supplying fluid to the compartment 28.

Although the system as so far described is operative, it is desirable to additionally provide the thermistor 48 for sensing the temperature of the fluid portion in compartment 30. The thermistor-sensor 48 in compartment 30 (FIG. 1) is also connected across the power supply busses 70 with series resistor 100. The thermistor-sensor 48 has a higher resistance than the thermistor-sensor 50 if the temperature of the fluid in the compartment 30 is lower than that of the heated fluid returning from the collector through the pipe 16 compartment 30. The potential from the thermistor 48 is supplied to an operational amplifier 102 on a lead 104 while the potential from the thermistor 50 is applied to the operational amplifier 102 over a lead 106. The operational amplifier 102 is again connected as a potential comparitor for comparing the potentials on the leads 104, 106. The lower potential on the lead 104 compared to that on the lead 106 then triggers a positive output of the operational amplifier 102. As with the output from the other operational amplifiers, the positive potential triggers conduction of a connected transistor 110 to trigger conduction of an SCR 112 which is connected in series with an actuating coil of a solenoid 114. The solenoid 114 then actuates a switch (not shown) to turn on the pump 11 to circulate fluid through the solar heat collector 10.

However, should the temperature of the fluid in the compartment 30 be above that of the fluid supplied from the heat collector 10, the relative resistances of the thermistor-sensors 48 and 50 will be reversed to reverse the relative potentials on the leads 104 and 106. The output from the operational amplifier 102 will then be a low potential which will not trigger conduction of transistor 110 or SCR 112 to energize the solenoid 114. The pump 11 will then be shut off.

As shown in FIGS. 1 and 2, the sensor 50 is positioned in the heat collector 10 at the junction of the heat collector with the fluid return pipe 16. Specifically, the sensor is shown in the Figures as mounted in a trough 51 which funnels heated fluid from a heat collecting surface 53 of heat collector 10 to the fluid return pipe 16. The sensor 50 is mounted for good thermal contact with the heat collecting surface 53 and, when fluid flows through the collector, for good thermal contact with the fluid. For example, the sensor 50 may be secured to the heat collecting surface 53 for good thermal contact the surface in a position, such as trough 51, which is in or near the flow of fluid heating in the collector 10 for good thermal contact with the fluid. The sensor 50 then senses the temperature of the heat collecting surface 53 when no fluid flows over the surface and the temperature of the fluid when it does flow over the surface.

This mounting arrangement of sensor 50 permits the sensor to perform two functions. When the temperature of the fluid heated in the collector falls below that of the fluid in the coolest compartment 30, the sensor 30 senses this temperature of the fluid entering pipe 16 while the sensor 48 senses the temperature of the fluid in compartment 30 to provide relative potentials to leads 104, 106 (FIG. 3) such that current to solenoid 114 (FIG. 3) is cut-off to stop the fluid pump 11 (FIGS. 1,2), as before described. The temperature of the fluid in compartment 30 is then not degraded during periods of such low solar heat energy intensity as do not heat the fluid in the collector 10 to a temperature above that of the fluid in compartment 30. The sensor 50 then functions to sense the temperature of the heat collecting surface 53. When the solar energy intensity increases to a level at which the temperature of the surface 53 rises above that of the fluid in compartment 30, sensors 48, 50 then provide relative potentials to leads 104, 106 (FIG. 3) such that solenoid 114 turns on pump 11 (FIGS. 1,2) to again supply fluid to the collector 10 for heating. When the temperature of the fluid then sensed by sensor 50 again falls below that of the fluid in compartment 30 as from a subsequent reduction of the solar heat intensity, sensors 48, 50 again cut off pump 11. Sensor 50 thus serves both to regulate the heating of fluid, including the earlier described regulation of the compartment to which the heated fluid is directed, and to regulate pump 11 to provide fluid to the heat collector 10 only during times when the fluid can be heated to a temperature above that of the coolest compartment.

An alternative embodiment is shown in FIG. 3 to include a device 116 which is connected by the load 104 to the operational amplifier 102 to apply a lower potential to the lead 104 than the potential on the lead 106 to restart the pump 11. For this purpose the device 116 may be a solar energy sensor such as a photo-electric device reponsive only to solar energy of an intensity predetermined to provide a known minimum temperature to fluid circulated through the heat collector 10. The device 116 will then restart the pump 11 to provide the minimum heat level to fluid circulated through the collector 10. A timer in the device 116 additionally applies the low potential to the lead 104 periodically and for a time duration predetermined to circulate fluid from the compartment 30 to the sensor 50 in the pipe 16. The device 116 is then cut off. Once fluid newly passed through the collector 10 has arrived at the sensor 50, the temperature comparison function of the thermistor-sensors 48 and 50 determines if the solar heat collector 10 is supplying heat to the fluid. If the fluid then reaching the sensor 50 is of a higher temperature than that in the compartment 30 as sensed by the thermistor 48, the lead 106 will be positive with respect to the lead 104 to maintain a positive output from the operational amplifier 104 thus holding pump 11 on.

FIG. 4 illustrates in section the valve 38. Fluid entering the valve through the pipe 16 reaches a butterfly-type diverting member 120 pivoted on a shaft 124 centrally in the pipe. With the diverting member in the position shown the fluid is directed away from the pipe 36. The fluid then flows toward another butterfly-type diverting member 122, like member 120, shown in a position for diverting the fluid toward the pipe 34 carrying the fluid to the compartment 28 (FIG. 1). This position of the diverting members 120 and 122 corresponds to the condition in which neither solenoid 86 or 98 is energized, as described with reference to FIG. 3.

If the temperature of the fluid in the pipe 16 should exceed only that of the fluid in the compartment 30, the solenoid 98 is energized as earlier described with reference to FIG. 3. This solenoid is connected to shaft 124 forming the pivot for the diverting member 120 and operates to rotate the diverting member in the direction indicated by the arrow. The diverting member 120 then diverts the fluid from the pipe 16 to the pipe 36 thereby providing the fluid to the compartment 30 (FIG. 1). When the solenoid 98 is not energized, means (not shown), such as a spring-loading in the solenoid, return the diverting member 120 to the illustrated position.

Similarly, when the temperature of the fluid in the pipe 16 exceeds that of the fluid in the compartment 26 (FIG. 1), solenoid 86 connected to a shaft 126 forming the pivot for the diverting member 122 rotates the diverting member 122 in the arrow-indicated direction to divert the fluid into the pipe 32 supplying the fluid to the compartment 26. In similarity to the solenoid 98, means, such as spring-loading in the solenoid 86, returns the diverting member to the illustrated position when the solenoid 86 is not energized.

FIG. 5 illustrates the connection of the solenoid 98 to the diverting member 120. The shaft 124 is seen to extend from the diverting member through a wall 130 of the valve 38 to the solenoid 98 for actuating the diverting member with the solenoid. The solenoid 98 and the similar solenoid 86 may, for example, be a rotary type commercially designated Ledex 3.

Having thus described my invention what I claim is:

1. In a heating system having a medium for storing heat, a solar heat collector for variably heating the medium with the variable intensity of solar energy, and a heat exchanger for withdrawing heat from the heated medium, a method of storing heat in the medium comprising storing different portions of the medium at different temperatures, supplying medium from the portion of the medium stored at the lowest temperature to the collector for heating the medium with the greatest thermal efficiency of the collector, combining the heated medium from the collector with one of the portions of the stored medium, and supplying medium from the portion of the medium stored at the highest temperature to the heat exchanger for providing the greatest thermal efficiency for the heat exchanger.

2. A method as set forth in claim 1 which includes sensing the temperatures of the portions of the medium and of the medium heated by the collector and directing the heated medium to a first portion of the medium which is at a temperature nearest below the temperature of the heated medium to permit heating of at least certain portions of the medium during periods of less than maximum solar energy intensity while preventing the degradation of the temperature of at least a certain other portion of the medium which was previously heated during a period of greater solar intensity to a temperature higher than the temperature of the heated medium.

3. In a heating system having a fluid medium for storing heat and a solar heat collector for variably heating the fluid with the variable intensity of solar energy, a method of storing heat in the fluid comprising storing different portions of the fluid in at least first and second compartments at different temperatures, sensing the temperatures of the portions of the fluid stored in each compartment, supplying fluid from the compartment which stores fluid at the lowest temperature to the collector to permit heating of the fluid with the greatest thermal efficiency of the collector, storing the heated fluid in the first compartment when the fluid stored therein is at a temperature nearest below the temperature of the heated fluid, and causing the heated fluid to be stored in the second compartment when the fluid stored therein is at a temperature nearest below the temperature of the heated fluid.

4. A method as claimed in claim 3 which includes inhibiting the supplying of the fluid to the collector whenever the temperature of the heated fluid is less than the temperature of the coolest portion of the fluid.

5. A method as claimed in claim 3 wherein the heating system additionally has means for using heat withdrawn from the fluid, said method further comprising withdrawing heat from a portion of the fluid stored at a highest temperature for providing the greatest thermal efficiency for the means using the heat.

6. In a heating system having a medium for storing heat, a solar heat collector for variably heating the medium with the variable intensity of solar energy, and a heat exchanger for withdrawing heat from the heated medium, an apparatus for storing the heated medium comprising storage means having a plurality of compartments for storing different portions of the medium at different temperatures, means for supplying the medium to the collector from the compartment in which the stored medium is at the coolest temperature for heating the medium with the greatest thermal efficiency of the collector, control means for returning the heated medium from the collector to one of the compartments, and means for supplying medium to the heat exchanger from the compartment in which the stored medium is at the highest temperature to provide the greatest thermal efficiency for the heat exchanger.

7. A system as claimed in claim 6 wherein said control means includes means for sensing the temperatures of the portions of the medium in each compartment and of the medium heated by the collector, and means for directing the heated medium to the compartment in which the stored medium is at a temperature nearest below the temperature of the heated medium.

8. In a heating system having a fluid medium for storing heat, a solar heat collector for variably heating the fluid with the variable intensity of solar energy, apparatus for storing the fluid comprising storage means partially divided into a at least first and second compartments for enabling different portions of the fluid to be stored in different compartments at different temperatures, means for sensing the temperature of the fluid stored in each compartment, means for supplying fluid to the collector from the compartment in which the stored fluid is at the lowest temperature to permit heating of the fluid by the collector, means for sensing the temperature of the fluid heated by the collector, and means for directing the heated fluid from the collector to the first compartment for storage therein whenever the fluid stored in said first compartment is at a temperature nearest below the temperature of the heated fluid, and for directing the heated fluid from the collector to the second compartment for storage therein whenever the fluid stored in said second compartment is at a temperature nearest below the temperature of the heated fluid.

9. A system as claimed in claim 8 additionally having means for using heat withdrawn from the fluid, said apparatus further comprising means for withdrawing heat from a portion of the fluid stored by said storage means which is at the highest temperature for providing the greatest thermal efficiency of the means using the heat.

10. A system as claimed in claim 8 in which said storage means includes overflow means interconnecting said compartments to permit the fluid stored in one of said compartments to flow into the other one of said compartments whenever the level of the fluid in said one compartment reaches a predetermined value.

11. A system as claimed in claim 8 which includes heat exchanger means for withdrawing heat from the fluid for heating a structure, said apparatus further comprising means for supplying fluid to the heat wxchanger means from the compartment in which the fluid is at the highest temperature.

12. A sytem as claimed in claim 1 which includes means for disabling said means for supplying fluid to said collector whenever the temperature of the heated fluid is less than the lowest temperature of the fluid stored in said compartments.

13. In a heating system having a fluid medium for storing heat, a solar collector for variably heating the fluid with the variable intensity of solar energy, apparatus for storing the fluid comprising storage tank means having a plurality of compartments for permitting different portions of the fluid to be stored in different compartments at different temperatures, temperature sensing means including an individual temperature sensor associated with each of said compartments for sensing the temperature of the portion of the fluid stored therein, pump means connected to an outlet of one of said compartments for normally supplying fluid from said one compartment to said collector for heating thereby, said temperature sensing means including a further temperature sensor for sensing the temperature of the fluid heated by the collector, and control means responsive to the temperature sensing means for directing the heated fluid to one of the compartments for storage therein when the fluid stored in said one compartment is at a temperature that is nearest below the temperature of the heated fluid, and for directing the heated fluid to a further one of the compartments for storage therein when the fluid stored in said further compartment is at a temperature that is nearest below the temperature of the heated fluid.

14. A system as claimed in claim 13 wherein said storage tank means has first, second and third compartments, and wherein the heated fluid is normally directed to said first compartment, said control means including first means for causing the heated fluid to be directed to said second compartment for storage therein whenever the temperature of the fluid in the first compartment exceeds the temperature of the heated fluid, and a second means for causing the heated fluid to be directed to the third compartment for storage therein whenever the temperature of the fluid in the second compartment exceeds the temperature of the heated fluid.

15. A system as claimed in claim 14 wherein said control means includes third means for disabling said pump means whenever the temperature of the fluid in the third compartment exceeds the temperature of the heated fluid.

16. A system as claimed in claim 14 additionally having heat exchanger means for using heat withdrawn from the fluid, which includes further pump means connected to an outlet of said first compartment for supplying fluid from said first compartment to said heat exchanger means.

17. In a heating system having a medium for storing heat and heating means for heating the medium, a method of storing heat in the medium comprising storing portions of the medium at different temperatures to permit heating of the portions independently of one another, supplying medium stored at the lowest temperature to said heating means for heating the medium, sensing the temperatures of the portions of the stored medium and the heated medium, causing the heated medium to be stored with a first portion of the medium which is stored at the highest temperature whenever the temperature of the first portion of the medium is nearest below the temperature of the heated medium, and causing the heated medium to be stored with a second portion of the medium which is stored at a lower temperature whenever the temperature of the second portion of the medium is nearest below the temperature of the heated medium.

18. In a heating system having a medium for storing heat and heating means for heating the medium, apparatus for storing the medium comprising storage means having a plurality of compartments for permitting different portions of the medium to be stored in different compartments at different temperatures, temperature sensing means for sensing the temperatures of the medium stored in each compartment and the heated medium, and control means responsive to the temperature sensing means for directing the heated medium from the heating means to one of the compartments for storage therein when the medium stored in said one compartment is at a temperature that is nearest below the temperature of the heated medium, said control means directing the heated medium to a further one of the compartments for storage therein when the medium stored in said further compartment is at a temperature nearest below the temperature of the heated medium.

* * * * *

UNITED STATES PATENT AND TRADEMARK OFFICE
CERTIFICATE OF CORRECTION

PATENT NO. : 3,931,806
DATED : January 13, 1976
INVENTOR(S) : Thomas Edward Hayes It is certified that error appears in the above—identified patent and that said Letters Patent are hereby corrected as shown below:

Column 11, line 56, "1" should be -- 11 --.

Signed and Sealed this twenty-fifth Day of May 1976

[SEAL]

Attest:

RUTH C. MASON
Attesting Officer

C. MARSHALL DANN
Commissioner of Patents and Trademarks